(12) United States Patent
Hoeltke et al.

(10) Patent No.: US 10,338,327 B2
(45) Date of Patent: Jul. 2, 2019

(54) DEVICE FOR INCOUPLING AND/OR OUTCOUPLING OPTICAL SIGNALS

(71) Applicant: Silicon Line GmbH, Munich (DE)

(72) Inventors: Holger Hoeltke, Munich (DE); Martin Groepl, Sonthofen Oberallgaeu (DE)

(73) Assignee: Silicon Line GmbH, Munich (DE)

( * ) Notice: Subject to any disclaimer, the term of this patent is extended or adjusted under 35 U.S.C. 154(b) by 0 days.

(21) Appl. No.: 15/271,358

(22) Filed: Sep. 21, 2016

(65) Prior Publication Data

US 2017/0075077 A1 Mar. 16, 2017

Related U.S. Application Data

(63) Continuation of application No. PCT/DE2015/100121, filed on Mar. 23, 2015.

(30) Foreign Application Priority Data

Mar. 22, 2014 (DE) .......................... 10 2014 205 373

(51) Int. Cl.
*G02B 6/42* (2006.01)

(52) U.S. Cl.
CPC ........... *G02B 6/423* (2013.01); *G02B 6/4274* (2013.01)

(58) Field of Classification Search
CPC ............................. G02B 6/423; G02B 6/4274
See application file for complete search history.

(56) References Cited

U.S. PATENT DOCUMENTS

| 6,456,766 | B1* | 9/2002 | Shaw | G02B 6/4274 385/47 |
| 6,585,426 | B2* | 7/2003 | Shuto | G02B 6/4201 385/88 |
| 2013/0084043 | A1* | 4/2013 | Ertel | G02B 6/3817 385/88 |
| 2014/0270650 | A1* | 9/2014 | Kasten | G02B 6/423 385/78 |

FOREIGN PATENT DOCUMENTS

| DE | 10 2012 005 618 A1 | 8/2013 |
| WO | 2012/176409 A1 | 12/2012 |

OTHER PUBLICATIONS

International Search Report issued in PCT/DE2015/100121; dated Oct. 12, 2015.

* cited by examiner

*Primary Examiner* — Ryan A Lepisto
(74) *Attorney, Agent, or Firm* — Studebaker & Brackett PC

(57) ABSTRACT

A device for coupling optical signals into at least one waveguide having at least one electro-optical converter, which sends out the optical signals in the direction of the axis or of the core of the waveguide, in such a way that active alignment of the waveguide is not necessary. The electro-optical converter is incorporated, in particular embedded, in at least one send-site optical subassembly, the send-site optical subassembly has at least one guiding channel for aligning the waveguide with respect to the electro-optical converter, in particular relative to the output port or to the active surface of the electro-optical converter, and at least one extension is assigned to the send-site optical subassembly, in particular to the guiding channel, the extension being provided for aligning the waveguide with respect to the guiding channel. Also, a device for decoupling optical (Continued)

signals from at least one waveguide having the features noted above.

12 Claims, 12 Drawing Sheets

DEVICE FOR INCOUPLING AND/OR OUTCOUPLING OPTICAL SIGNALS

CROSS-REFERENCE TO RELATED APPLICATIONS

This application is a continuation of international (WO) patent application no. PCT/DE2015/100121, filed 23 Mar. 2015, which claims the priority of German (DE) patent application no. 10 2014 205 373.0, filed 22 Mar. 2014, the contents of each being hereby incorporated herein by reference.

FIELD OF THE INVENTION

The present invention basically relates to the technical field of optical sub assemblies (OSA).

More particularly, the present invention relates to a device for coupling optical signals into at least one waveguide, and to a complementary device for decoupling optical signals from at least one waveguide The present invention further relates to a method for producing such device for coupling/decoupling optical signals into/from at least one waveguide.

BACKGROUND OF THE INVENTION

As optical converters, in particular as active optical converters, vertical cavity surface emitting lasers (VCSEL) or photodiodes (PD) send or receive optical signals essentially perpendicular to their surface.

In order to couple such optical signals SI into an optical waveguide WL or decouple them from an optical waveguide WL, the optical signals SI are to be deflected by a 45 degree deflection mirror from the transmitting or receiving direction of the optical converter WA into a plane of the waveguide WL offset by ninety degrees, as may be taken from FIG. 1.

Publication DE 10 2012 005 618 A1 describes an active optical cable, whose fibers are materially bonded to an optical substrate. The fibers here become coupled with an integrated optical waveguide. A deflection element guides the free jet to the processing unit located on the substrate surface, wherein the free jet undergoes a directional change of ninety degrees, so as to direct the free jet into a transceiver unit.

Alternatively, optical converters WA can be arranged by means of a corresponding bracket HA in such a way that their transmitting or receiving direction corresponds to the plane of the waveguide WL, as may be taken from FIG. 2A and FIG. 2B.

The disadvantage to the solutions known from prior art consists in that the alignment of the optical axis between the waveguide (=the optical fiber) and the optical converter must be actively carried out repeatedly.

Alternatively to the active alignment of the optical fibers, the conventional option exists to align optical fibers with the (at least one) optical converter(s) using so-called V-grooves (cf. FIG. 3).

The frame size of the known coupling and decoupling devices poses further difficulties. This frame size and structural design make the known solutions unsuitable for the realization of applications for home and mobile electronics. This implies longer connection paths between the components, and thus longer latency periods.

In addition, the manufacturing expenses for the solutions known from prior art are high and cost-intensive.

OBJECTS AND SUMMARY OF THE INVENTION

Starting from the above-explained disadvantages and shortcomings as well as taking the outlined prior art into account, the object of the present invention is to further develop a coupling device of the above-mentioned type and a decoupling device of the above-mentioned type in such a way that active alignment of the waveguide is not necessary; in addition, a corresponding miniaturization of the coupling and decoupling device is to be enabled at low optical losses, and at the same time, the manufacturing expenses are to be low.

This object is achieved by a coupling device according to the invention with the herein described features and by a decoupling device according to the invention with the herein described features, in particular by a miniaturized and modularized active optical transmitting unit and/or by a miniaturized and modularized active optical receiving unit. Advantageous embodiments and expedient further developments of the present invention are described above and below.

This object is achieved by a device for coupling optical signals into at least one waveguide, wherein the device comprises at least one electro-optical converter which sends out the optical signals in the direction of the axis or of the core of the waveguide, wherein the electro-optical converter is incorporated, in particular embedded, in at least one send-site optical subassembly, wherein the send-site optical subassembly comprises at least one guiding channel for aligning the waveguide with respect to the electro-optical converter, in particular relative to the output port or to the active surface of the electro-optical converter, and wherein at least one extension is assigned to the send-site optical subassembly, in particular to the guiding channel, said extension being provided for aligning the waveguide with respect to the guiding channel.

This object is also achieved by a device for decoupling optical signals from at least one waveguide, wherein the device comprises at least one opto-electrical converter which receives the optical signals from the direction of the axis or of the core of the waveguide, wherein the opto-electrical converter is incorporated, in particular embedded, in at least one receive-site optical subassembly, wherein the receive-site optical subassembly comprises at least one guiding channel for aligning the waveguide with respect to the opto-electrical converter, in particular relative to the input port or to the active surface of the opto-electrical converter, and wherein at least one extension is assigned to the receive-site optical subassembly, in particular to the guiding channel, said extension being provided for aligning the waveguide with respect to the guiding channel.

This object is further achieved by an embodiment according to the invention wherein the extension has the form of a groove or trough or sag.

This object is further achieved by an embodiment according to the invention wherein the extension is arranged in front of the end of the guiding channel in such way that a seamless and/or stepless transition into the guiding channel is defined, said end being averted from the converter.

This object is further achieved by an embodiment according to the invention wherein the form and/or the dimensioning of the extension, in particular of the area of the extension where the waveguide lies, is adapted to the form and/or to the dimensioning of the guiding channel, in particular of the corresponding area of the guiding channel.

This object is further achieved by an embodiment according to the invention wherein the form and/or the dimensioning of the extension, in particular of the area of the extension where the waveguide lies, are/is substantially equal to the form and/or to the dimensioning of the guiding channel, in particular of the corresponding area of the guiding channel.

This object is further achieved by an embodiment according to the invention wherein the extension is produced from at least one optically transparent or optically semi-transparent medium, in particular from at least one polymer.

This object is further achieved by an embodiment according to the invention wherein at least one air outlet is provided, via which trapped and/or compressed air can be vented when the waveguide is inserted in the guiding channel.

This object is further achieved by an embodiment according to the invention wherein the air outlet has the form of a groove or channel.

This object is further achieved by an embodiment according to the invention wherein the air outlet extends along the guiding channel, in particular over the entire length of the guiding channel.

This object is further achieved by an embodiment according to the invention wherein the air outlet is provided only in the area of the guiding channel which does not encounter the extension.

This object is further achieved by an embodiment according to the invention wherein at least two substantially parallel guiding channels are provided, with a respective extension being arranged before each guiding channel.

This object is further achieved by an embodiment according to the invention
wherein the electro-optical converter is at least one laser, in particular at least one vertical cavity surface emitting laser (VCSEL), and/or
wherein the opto-electrical converter is at least one diode, in particular at least one photodiode (PD).

This object is further achieved by a three-dimensional micro-stereolithographic printing method for producing the device.

This object is further achieved by a use of the device according to the invention for constructing at least one, in particular pluggable, active optical cable.

According to the present invention, at least one converter may be embodied
as at least one electro-optical converter, in particular as at least one vertically emitting laser (VCSEL=vertical cavity surface emitting laser), or
as at least one opto-electrical converter, in particular as at least one photo diode (PD);
the at least one converter is arranged in such way that its transmitting or receiving direction corresponds to the plane of the waveguide.

Therefor, an optical subassembly (OSA) is produced in a suitable manufacturing method in particular from at least one optically transparent or optically semi-transparent medium, for example from a polymer, and is conformed to both exclusively incorporate the one or more converters in preferably optically transparent material, and to ensure the precise, direct alignment of the optical axis of the converter with the optical axis of the optical fiber, without a ferrule, bare fiber or lens.

These requirements to be satisfied by the optical subassembly are achieved by the arrangement of the elements in the optical subassembly and by the conformation of the optical subassemblies.

The manufacturing method may be a three-dimensional micro-stereolithographic printing process, which embeds the converter in the preferably optically transparent material, for example in an optically transparent polymer, during the printing process.

Besides the embedding of the converters, the arrangement of the elements and the precise conformation of the optically transparent material, this manufacturing method also enables the metal contacting of the terminal contacts, for example of the anode and of the cathode, of each embedded converter. In this context, the optical fiber or the waveguide may be, in particular in the plane of the substrate, aligned coaxially with a peripheral cable or peripheral contact that is fastenable to the terminal contacts.

This may be particularly significant for the attachment of active optical cables (AOC).

According to a preferred embodiment of the present invention, the device may comprise an enclosing housing, by which the device may be protectable from external influences. This is particularly significant for use as an active optical cable, since the housing can then be used as a plug with a mechanism for connecting to peripheral devices.

By the above-mentioned manufacturing method, it is possible to manufacture thousands of such optical subassemblies at the same time while they are arranged in a linear two-dimensional pattern, for example on a glass carrier, thereby assuring an extremely favourable cost structure for said optical subassemblies.

Although such a technical solution connects the optical fiber, in particular the glass fiber, or the waveguide with the converter in a very cost-effective manner, it is difficult to automatize the introducing of the optical fiber or of the waveguide into the guiding channel.

In order to achieve good results when coupling light from the electro-optical converter into the optical fiber or when decoupling light from the optical fiber into the opto-electrical converter, the inner diameter of the guiding channel is merely negligibly greater than the outer diameter of the optical fiber. The difference between these two diameters is typically about ten micrometers or less.

Conventional placing robots or placing machines may attain such preciseness but are in such case very expensive and reach only slow process velocities when introducing the optical fiber or the waveguide into the guiding channel.

Significantly cheaper placing robots or placing machines typically attain a preciseness of merely about fifty micrometers to about 200 micrometers. In order to ensure a highly precise alignment of the optical axis of the optical fiber or of the waveguide with the optical axis of the converter by means of an inexpensive placing robot or by means of an inexpensive placing machine, according to the invention at least one extension is attached to the optical subassembly (OSA), said extension in particular having the form of a groove or trough or sag, and being for example at least one waveguide trough or at least one fiber sag.

According to a preferred embodiment, said extension may be produced from an optically at least partly transparent medium, in particular from at least one polymer.

Independently thereof, or in conjunction therewith, the bottom of said extension may preferably have a circular form. Such a circular forming may preferably have the same diameter as the actual guiding channel. By seamlessly and steplessly connecting the extension to the guiding channel, it is enabled that an optical fiber inserted into the expansion precisely slides into the guiding channel by simply moving forward.

The all around closed guiding channel holds the end of the optical fiber or of the waveguide in a position exactly aligned with the converter embedded in the optical subassembly (OSA), without any additional fixing measures, as for example glue, being necessary.

With the extension and the guiding channel which is arranged in the optical subassembly (OSA), a novel fiber alignment element has been developed by means of which it is possible to automatically and inexpensively introduce the optical fiber or the waveguide into the guiding channel, for example by means of a placing robot or by means of a placing machine attaining a preciseness of merely about fifty micrometers to about 200 micrometers.

By the extension, it is possible to make the imprecisions of such inexpensive placing robots or placing machines compatible with the demands on a precise alignment of the optical axis of the converter with the optical axis of the optical fiber or of the waveguide.

By the extension according to the invention, a simple inserting of the optical fiber or of the waveguide relative to the converter is possible, said inserting allowing a certain tolerance. Once the optical fiber or the waveguide lies on the bottom of the extension, a simple moving forward of the optical fiber or of the waveguide into the guiding channel suffices to accomplish the optical coupling between the converter embedded in the OSA and the optical fiber.

The extension according to the present invention, being embodied as fiber alignment element, thus enables a highly precise aligning of the optical axis of the optical fiber or of the waveguide with the optical axis of the converter by means of an inexpensive placing robot or by means of an inexpensive placing machine.

The extension according to the present invention, being embodied as fiber alignment element, thus enables the use of a placing robot or of a placing machine attaining for example a placing preciseness of elements in an order of merely about 200 micrometers but showing a very high process velocity.

According to an expedient embodiment of the present invention, a multi-channel arrangement may be provided, said multi-channel arrangement comprising several guiding channels being substantially parallel to each other. Each of these guiding channels may be provided with an extension according to the present invention.

Finally, the present invention relates to the embedding of at least one electro-optical converter, in particular at least one vertical cavity surface emitting laser (VCSEL), or at least one opto-electrical converter, in particular or at least one photodiode (PD), in an optically transparent material, which may serve, in combination with the at least one extension, in particular in combination with the at least one groove type or trough type or sag type extension, for example in combination with the at least one waveguide trough or in combination with the at least one fiber sag, for mechanical guidance and alignment of at least one optical fiber or of at least one waveguide relative to these converters.

The suggested device for coupling and decoupling optical signal may be described as an optical subassembly (OSA) or a mechanical seating, and can be used profitably in many application fields, primarily for the rapid transmission of signals between two components with electrical signal routing.

Accordingly, the present invention relates above all to the use thereof for attaching in particular pluggable active optical cables for rapid, low-loss signal conversion and data transmission in a very small installation space, to forward the electrically processed data quickly to the various units. The extremely short circuit paths within the device enable very short latency periods.

According to the invention, modularization of the extension enables an extremely high degree of automation during production. The separate assembly of the substrate with the ASIC, of the optical subassembly with embedded electro-optical and/or opto-electrical converter, in particular with embedded electro-optical transmitter and/or with embedded opto-electrical receiver, of the extension and of the hardwired fiber, means that the two components can also be processed further separately.

For example, the substrate with ASIC may be mounted and wave soldered onto a printed circuit board by machine in an automated "pick and place" process, while the optical subassembly can be forwarded to a later process step with the fiber, which is typically heat-sensitive.

The extension, in particular having the form of a groove or trough or sag, for example the waveguide trough or the fiber sag, enables as fiber alignment element the mechanical guidance and alignment of the one or more optical fibers with the one or more electro-optical converters, in particular with the one or more vertically emitting laser (VCSEL), or with the one or more opto-electrical converters, in particular with the one or several photodiodes (PD).

The use of the invention as a pluggable active optical cable for the connection of peripheral devices is also conceivable, wherein processing of the electrical input and output signals, as well as conversion of the electrical signals into optical signals or of optical signals into electrical signals by electro-optical or opto-electrical converters, and the coupling of the optical signals into the waveguide, and decoupling therefrom is carried out in the plug ends of the cable.

Here, bidirectional cables may also be made available, particularly if the transmitting and receiving components are integrated in one accommodation/aligning module, or omnidirectional cables if the electro-optical converter is also an opto-electrical converter.

Moreover, this device also enables a novel assembly of a miniaturized electro-optical transmitter and/or a miniaturized opto-electrical receiver with an optical waveguide hardwired to the optical subassembly (OSA) to be created for transmitting electrical signals via such an optical waveguide.

The present invention particularly features a high degree of miniaturization, which is attributable to the inventive nature of the positioning, modularization and integration of the components. This in turn enables assembly with an active optical cable (AOC) with at least one miniaturized optical subassembly (OSA) of such kind.

The construction of such an extremely small, miniaturized optical subassembly in turn enables construction of a miniaturized electro-optical transmitter or a miniaturized opto-electrical receiver, each with connected optical waveguide or connected optical fiber, wherein the optical fiber that is connected to the optical subassembly is guided and aligned by said optical subassembly, in particular by the guiding channel provided in the optical subassembly.

By means of the extension, in particular by means of the groove type or trough type or sag type extension, for example by means of the waveguide trough or by means of the fiber sag, the direct integration of the waveguide in the optical subassembly, in particular through the use of transparent media for manufacturing the optical subassembly and/or the extension, makes it possible to achieve very short signal connection lengths, bond wire lengths, for example, which helps to improve the received signal quality and reduces latency periods particularly with very high data transmission rates.

The modularization according to the present invention also provides opportunities to make substantial cost savings in production, for example by enabling a higher degree of automation.

BRIEF DESCRIPTION OF THE DRAWINGS

As already discussed hereinbefore, there are various possibilities for embodying and further developing the teaching of the present invention in an advantageous manner. To this end, on the one hand reference is made to the explanations above and to the dependent claims, and on the other hand further embodiments, features and advantages of the present invention are explained in greater detail hereinafter, inter alia based upon the seven exemplary embodiments illustrated by FIG. 5A to FIG. 11C.

It is shown in.

Figure 1:
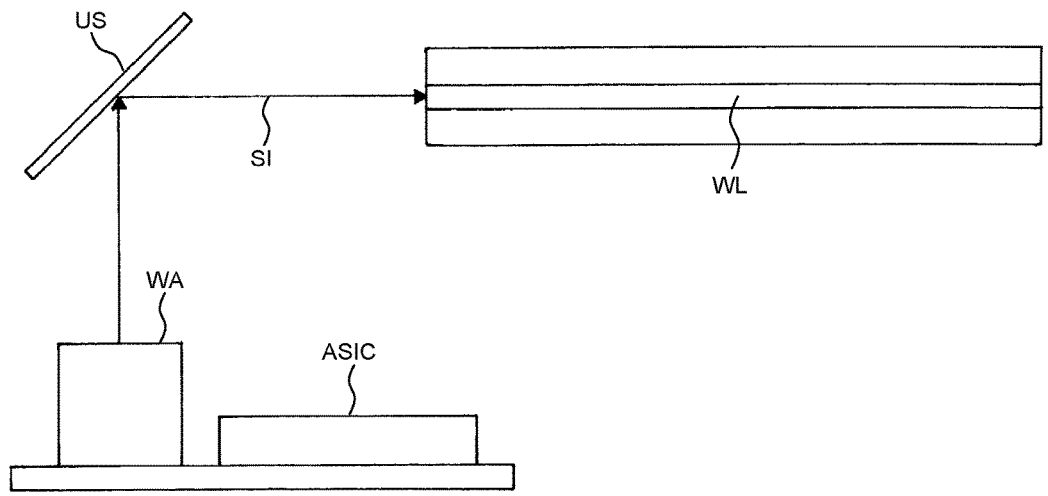
FIG. 1 a conceptual schematic view of a device according to the prior art, with which optical signals can be coupled at an angle of ninety degrees to the direction of emission.

Like or similar embodiments, elements or features are provided with identical reference numerals in FIG. 4 to FIG. 11C. While no graphic distinction is made between the transmission side and the reception side, the receive-site elements corresponding to the send-site elements have a reference numeral that is higher by 40.

DETAILED DESCRIPTION OF THE INVENTION

In order to avoid unnecessary repetitions, the explanations below relate to all seven of the exemplary embodiments of the present invention illustrated on FIG. 5A to FIG. 11C with respect to the configurations, features and advantages of the present invention, unless otherwise indicated:

The send-site layouts on FIG. 5A to FIG. 11C present respectively a device 100a, 100b, 100c, 100d 100e, 100f, 100g for coupling optical signals into a waveguide 10. The device 100a, 100b, 100c, 100d 100e, 100f, 100g has a send-site circuit (not shown), which based on incoming signals from send-site terminal contacts 22 actuates an electro-optical converter 28, which sends out the optical signals in the direction of the axis 12 of the waveguide 10.

The receive-site layouts on FIG. 5A to FIG. 11C present respectively a device 140a, 140b, 140c, 140d 140e, 140f, 140g for decoupling optical signals from at least one waveguide 10 in an opto-electrical converter 68, which receives the optical signals from the direction of the axis 12 of the waveguide 10, and transmits them as electrical signals to a receive-site circuit (not shown), which processes the incoming electrical signals and outputs them to receive-site terminal contacts.

Figure 5A:
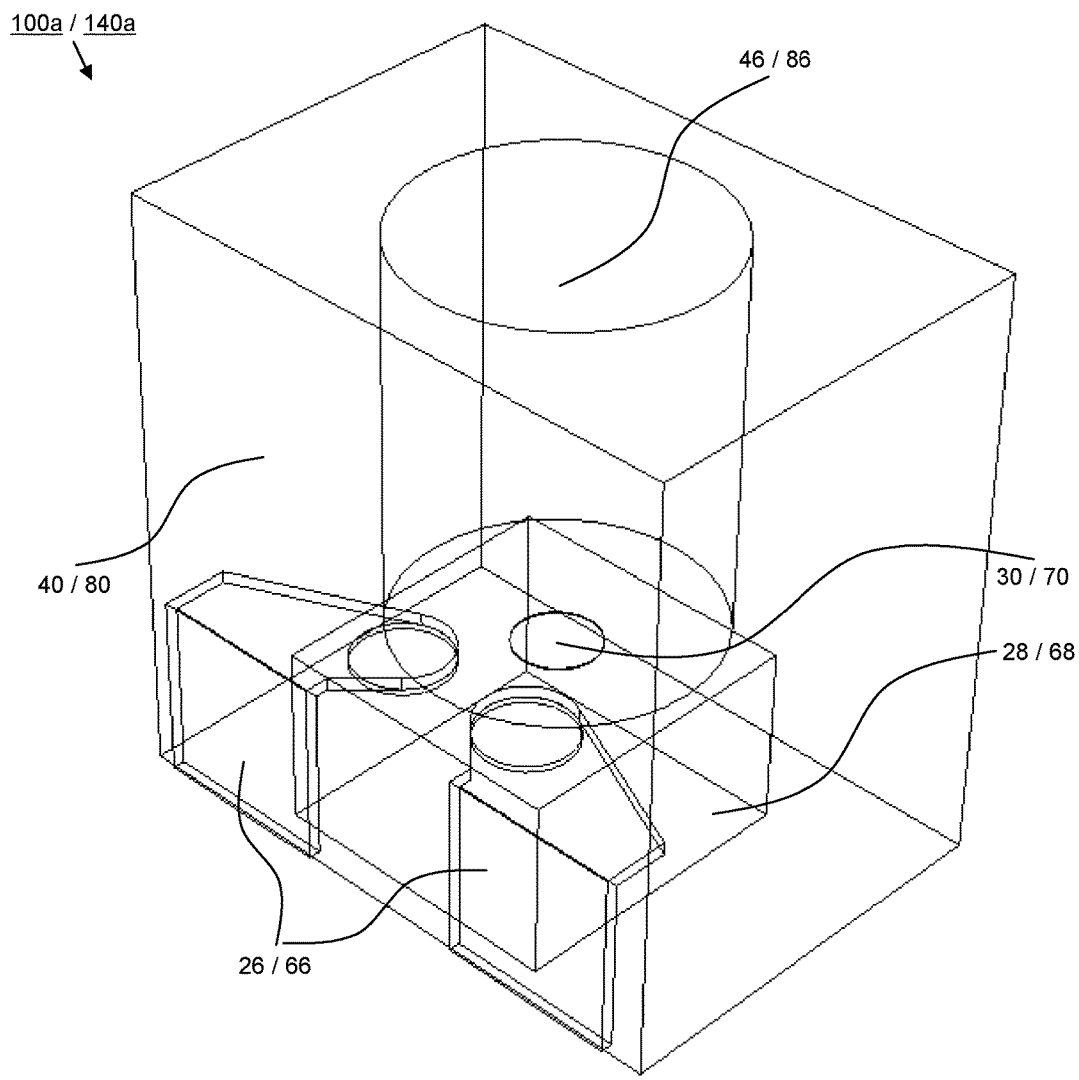
FIG. 5A a perspective view of a first detailed example for an optical subassembly (OSA) with embedded converter wherein the optical fiber or the waveguide is movable into the guiding channel of the OSA to the converter by means of an embodiment of the extension according to the present invention as shown in FIG. 11A.
Figure 5B:
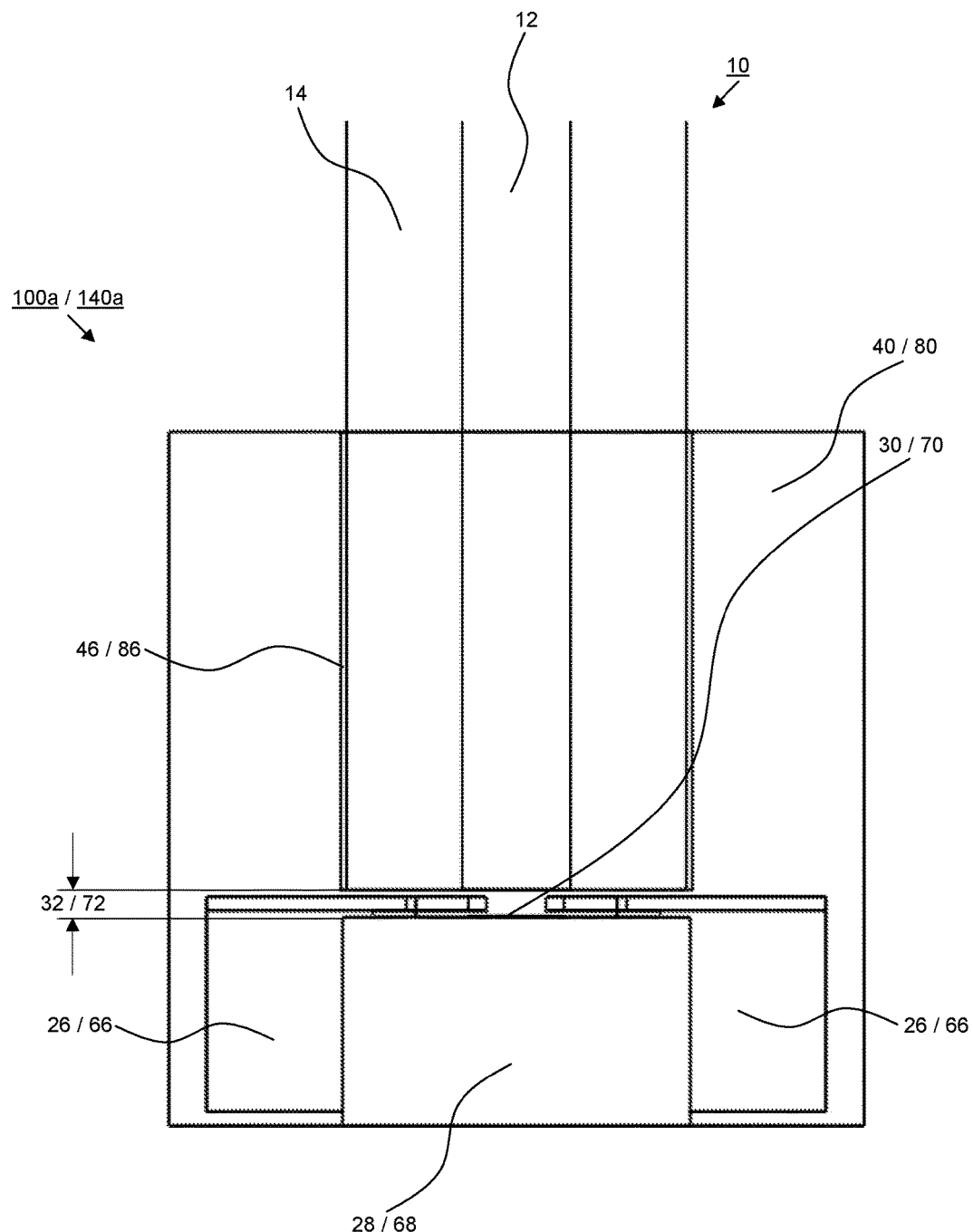
FIG. 5B a side view of the optical subassembly (OSA) of FIG. 5A with the optical fiber or waveguide inserted in the guiding channel.
Figure 6:
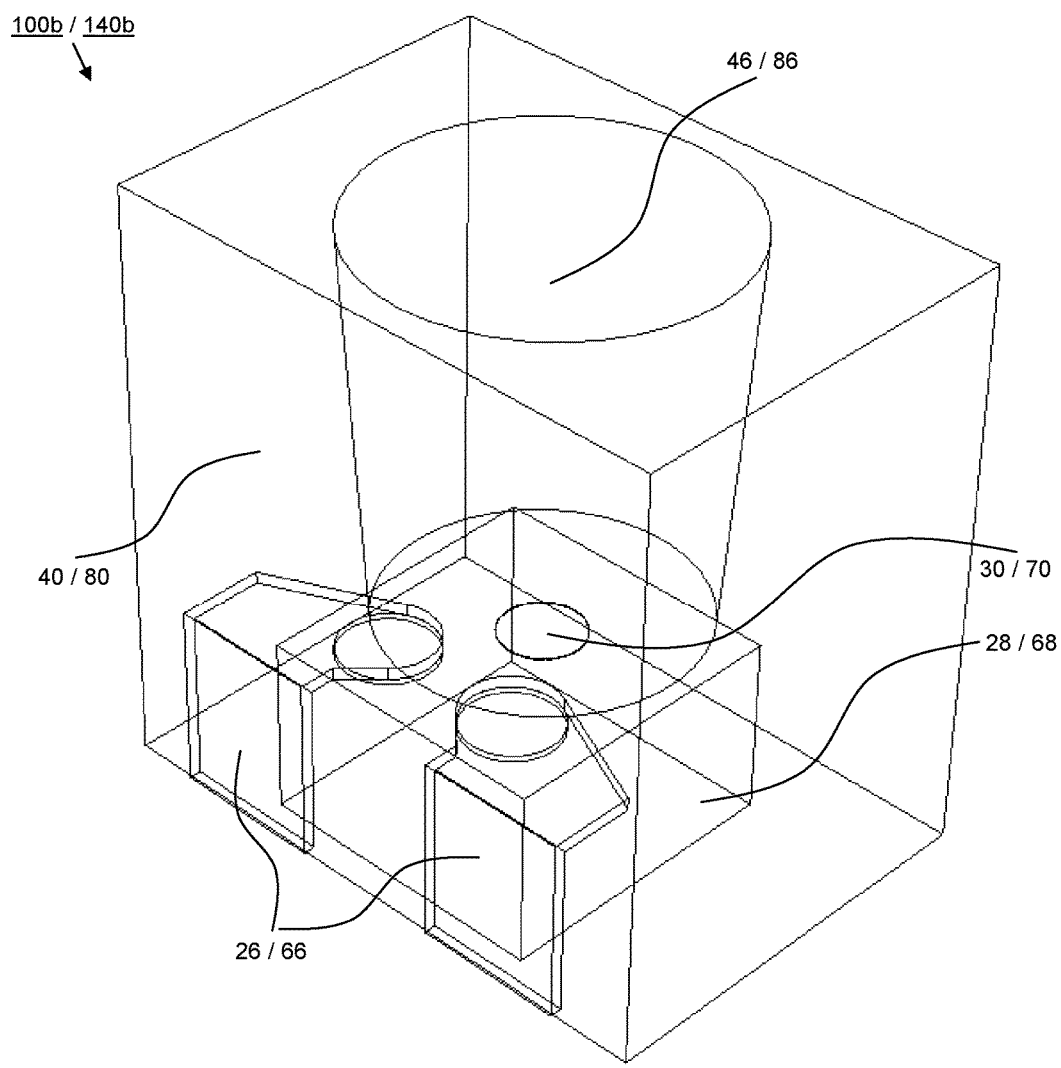
FIG. 6 a perspective view of a second detailed example for an optical subassembly (OSA) with embedded converter wherein the optical fiber or the waveguide is movable into the guiding channel of the OSA to the converter by means of an embodiment of the extension according to the present invention as shown in FIG. 11A.

According to the invention, the arrangement of the elements in an optical subassembly manufactured from transparent polymer or in an optical subassembly 40 and 80 is configured in such a way that the core surface 12 of the optical fiber 10 is seated directly on the outlet port 30 of the laser 28 and on the active surface 70 of the photodiode 68, or at a distance 32 of just a few micrometers, perhaps twenty, above it (cf. first embodiment according to FIG. 5A and FIG. 5B).

The arrangement of the elements in the optical subassembly 40 or 80 does not require a deflection mirror or lens
  to align the optical signal from the output port 30 of the laser 28 into the optical fiber 10 or
  to align the optical signal from the optical fiber 10 with the active surface 70 of the photodiode 68.

The arrangement of metal contacts is advantageously carried out in such a way that on the one hand they contact the terminal contacts 26 or 66 of the embedded converter 28 or 68, which contacts are particularly realized as metal pressure contacts or sliding contacts, and on the other, emerging from the material of the optical subassembly 40 or 80, are incident on a lateral surface of the outside of the optical subassembly 40 or 80 offset by ninety degrees with respect to the terminal contacts 26 or 66 of the converter 28 or 68 (cf. FIG. 5A and FIG. 5B).

The optical subassembly 40 or 80 is conformed such that the optical fiber 10 and core 12, together with the optical sheathing 14 (cf. FIG. 5B) that completely surrounds the optical core 12 is aligned with output port 30 of the electro-optical converter 28 and the active surface 70 of the opto-electrical converter 68 in a precisely fitting cylindrical fiber guiding channel 46 or 86 of the optical subassembly 40 or 80.

In this context, particularly the optical core 12 of the optical fiber 10 may be aligned centrally over the output port 30 of the electro-optical converter 28 or centrally over the active surface 70 of the opto-electrical converter 68 (cf. FIG. 5A and FIG. 5B).

In addition, the conformation of the optical subassembly 40 or 80 enables the core surface 12 of the optical fiber 10 to be seated directly on the outlet port 30 of the laser 28 and on the active surface 70 of the photodiode 68, or at a distance 32 of just a few micrometers, perhaps twenty, above it (cf. first embodiment according to FIG. 5A and FIG. 5B).

The abovementioned technical features enable the realization of an optical subassembly 40 or 80 with a volume of less than one cubic millimeter.

Figure 7:
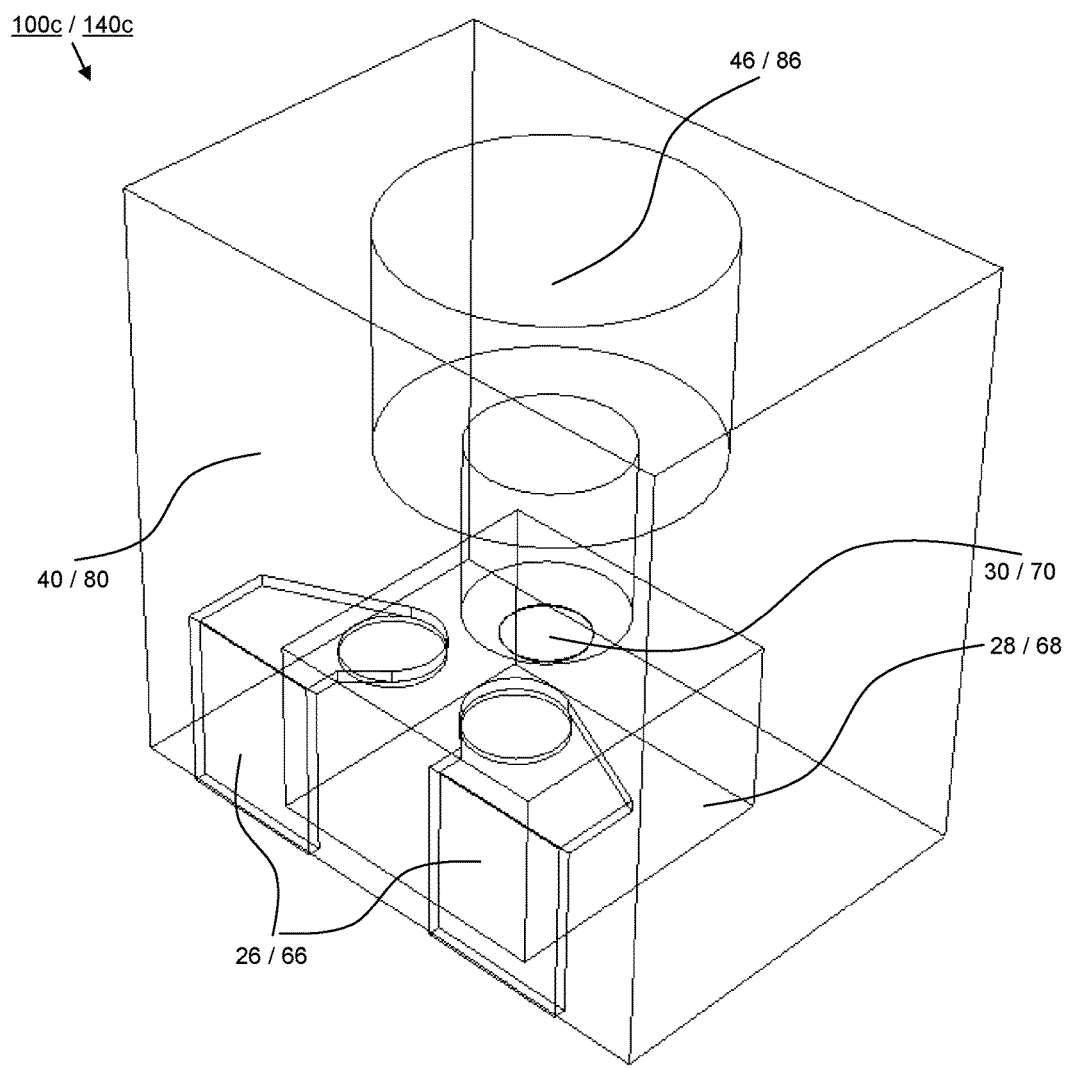
FIG. 7 a perspective view of a third detailed example for an optical subassembly (OSA) with embedded converter wherein the optical fiber or the waveguide is movable into the guiding channel of the OSA to the converter by means of an embodiment of the extension according to the present invention as shown in FIG. 11A.
Figure 8:
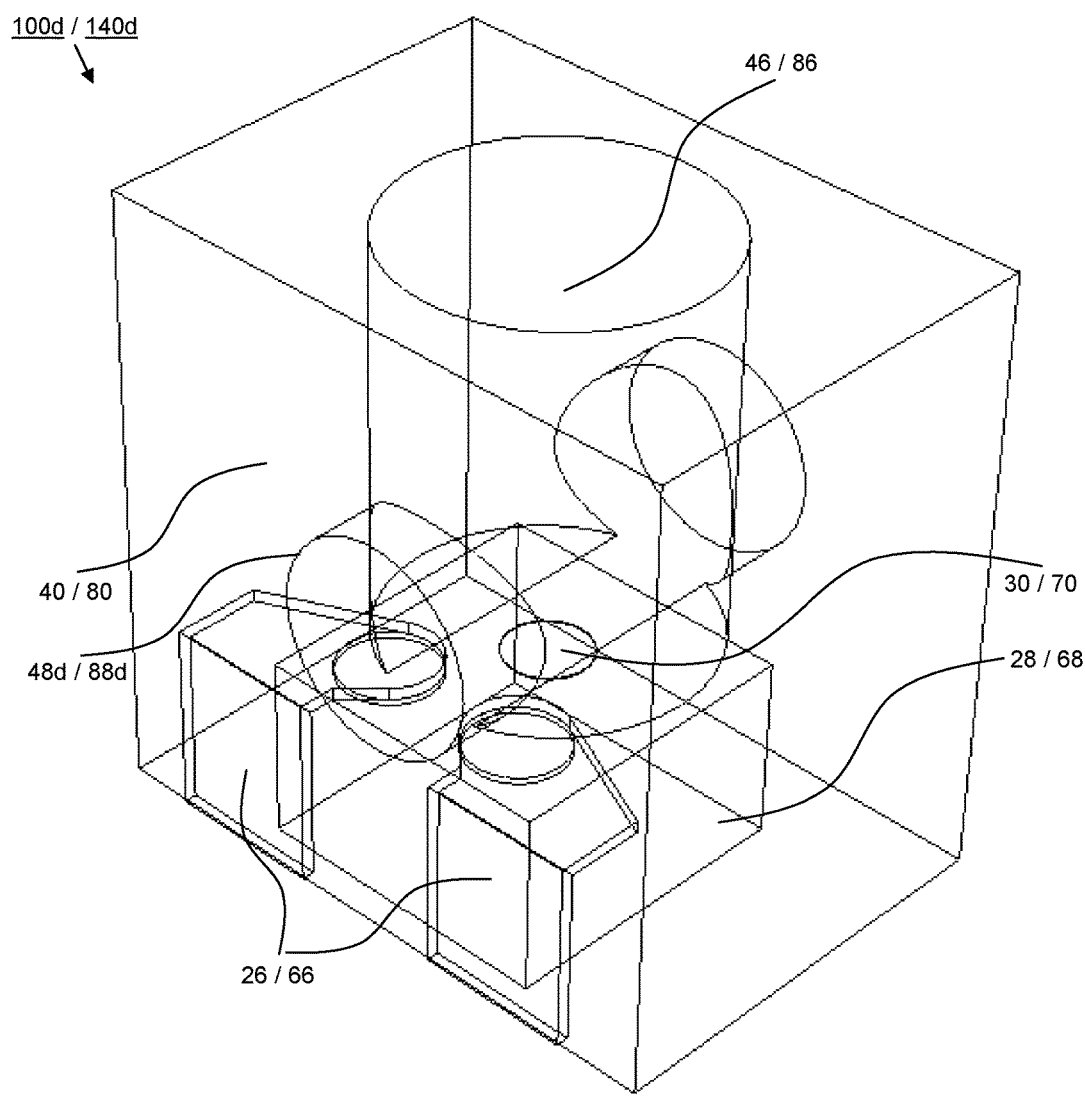
FIG. 8 a perspective view of a fourth detailed example for an optical subassembly (OSA) with embedded converter wherein the optical fiber or the waveguide is movable into the guiding channel of the OSA to the converter by means of an embodiment of the extension according to the present invention as shown in FIG. 11A.
Figure 9:
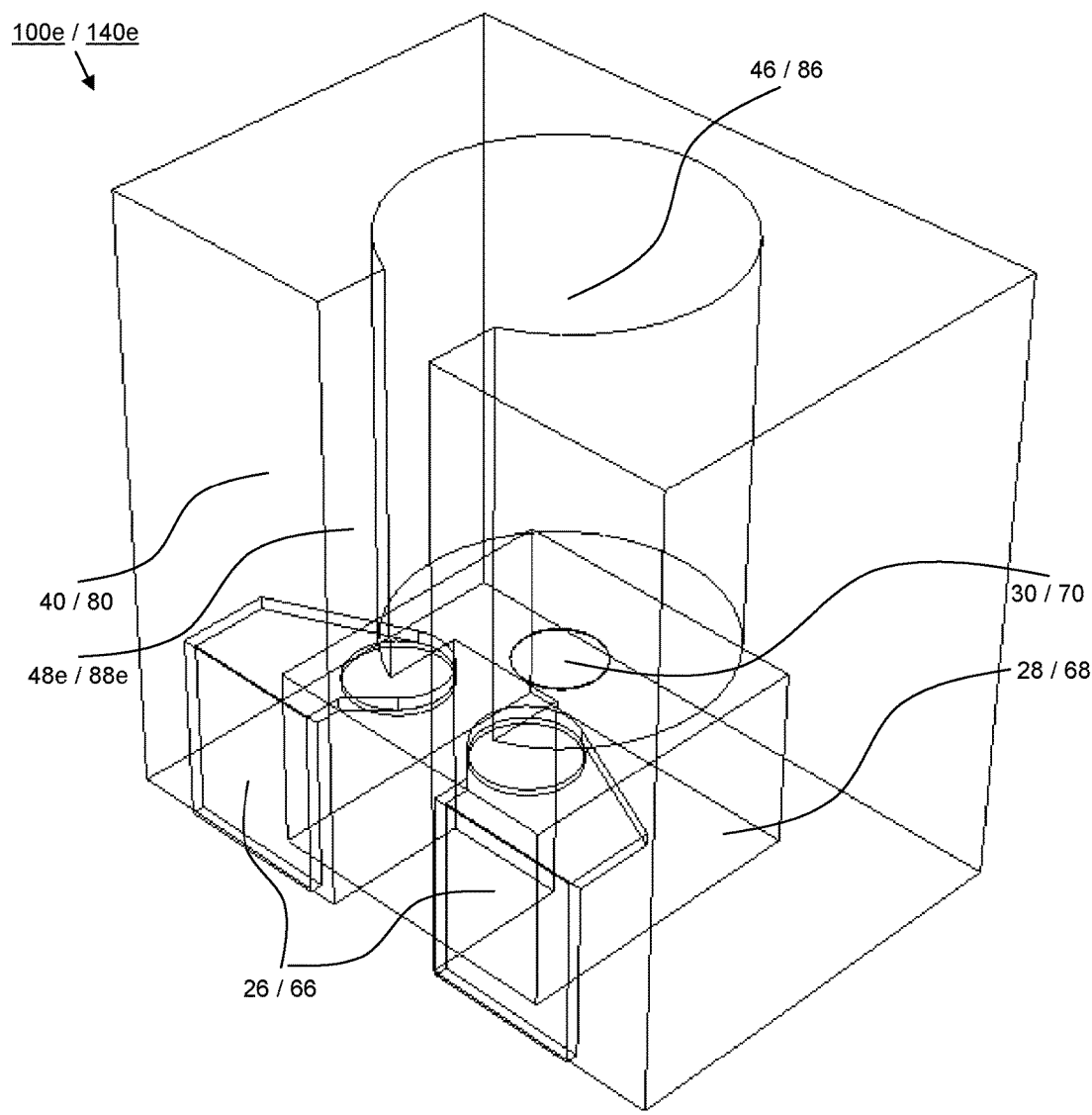
FIG. 9 a perspective view of a fifth detailed example for an optical subassembly (OSA) with embedded converter wherein the optical fiber or the waveguide is movable into the guiding channel of the OSA to the converter by means of an embodiment of the extension according to the present invention as shown in FIG. 11A.
Figure 10:
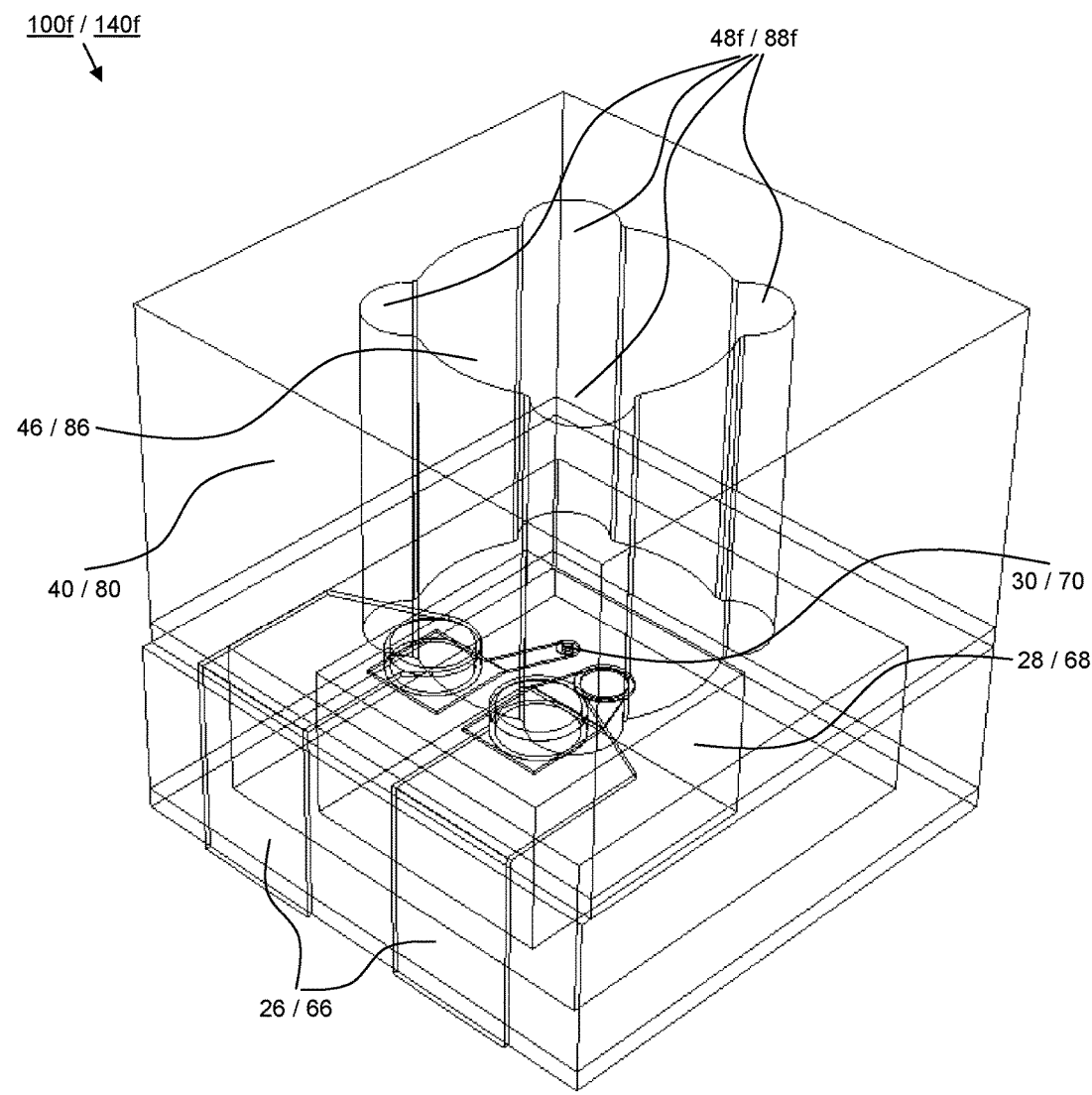
FIG. 10 a perspective view of a sixth detailed example for an optical subassembly (OSA) with embedded converter wherein the optical fiber or the waveguide is movable into the guiding channel of the OSA to the converter by means of an embodiment of the extension according to the present invention as shown in FIG. 11A.

In further exemplary embodiments of the present invention, in order to enable the optical fiber 10 to be inserted more quickly and easily, the (fiber) guiding channel 46 or 86 in optical subassembly 40 or 80 may also be tapered conically towards the converter 28 or 68 (cf. second embodiment according to FIG. 6) or graduated, particularly with at least two different cylindrical internal diameters (cf. third embodiment according to FIG. 7).

Since it can happen that air becomes trapped and compressed when the optical fiber 10 is inserted, particularly in the non-conical guiding channel 46 or 86, poor optical coupling and consequently optical losses can occur between the converter 28 or 68 and the optical fiber 10.

For this reason, additionally
  at least one air outlet 48*d* or 88*d* arranged for example laterally on the end of the guiding channel 46 or 86 closest to the converter 28 or 68 in the optical subassembly 40 or 80, wherein the axial direction of the air outlet 48*d* or 88*d* extends transversely, in particular substantially perpendicularly to the direction of the axis or core 12 of the waveguide 10 (cf. fourth embodiment according to FIG. 8),
  at least one air outlet groove 48*e* or 88*e* arranged laterally or on the side, and particularly extending over the entire length of the optical subassembly 40 or 80, for example over the entire length of the guiding channel 46 or 86 (cf. fifth embodiment according to FIG. 9) or
  at least one air outlet channel 48*f* or 88*f*, particularly extending over the entire length of the optical subassembly 40 or 80, for example over the entire length of the guiding channel 46 or 86, wherein the air outlet channels 48*f* or 88*f*,
    of which four air outlet channels 48*f* or 88*f* are shown for exemplary purposes, may be arranged equidistantly and symmetrically about the cylindrical guiding channel 46 or 86 (cf. sixth embodiment according to FIG. 10), or
    of which two air outlet channels 48*f* or 88*f* are shown for exemplary purposes, may be arranged on the same side of the cylindrical guiding channel 46 or 86, i.e. only in the area of the guiding channel 46 or 86 which does not encounter the extension 90 (cf. seventh embodiment according to FIG. 11A to FIG. 11C), may be provided to ensure even, reliable and complete venting of any air that becomes trapped and compressed when waveguide 10 is inserted in guiding channel 46 or 86.

Figure 4:
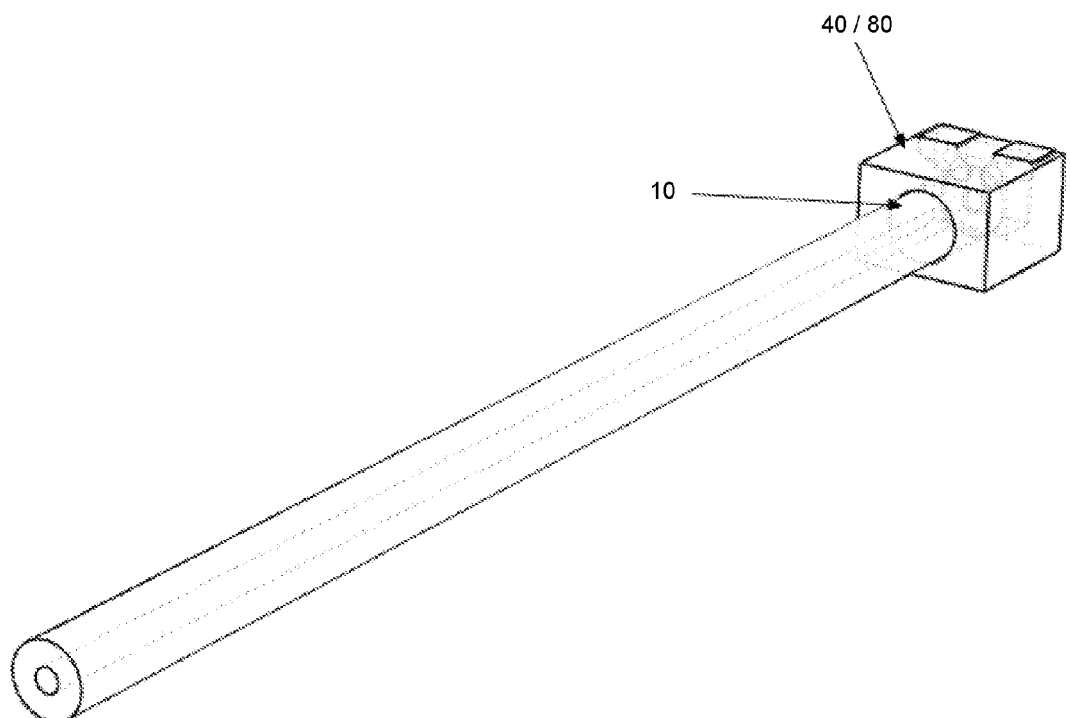
FIG. 4 a perspective view of a summarizing example for an optical subassembly (OSA) with embedded converter wherein the optical fiber or the waveguide has been moved in the guiding channel of the OSA to the converter.

All seven embodiments according to FIG. 5A to FIG. 11C have in common that the converters 28 or 68 are arranged in the optical subassembly 40 or 80 in such way that their transmitting or receiving direction corresponds to the plane of the optical fiber or of the waveguide 10 (therefor cf. also the summarizing view of FIG. 4).

With this build-up, this technical solution connects the optical fiber 10 with the converter 28 or 68 in a very cost-efficient manner. In order to achieve good results when coupling light from the electro-optical converter 28 into the optical fiber 10 or when decoupling light from the optical fiber 10 into the opto-electrical converter 68, the inner diameter of the guiding channel 46 or 86 is merely negligibly greater than the outer diameter of the optical fiber 10. The difference between these two diameters is typically about ten micrometers or less.

In this context, the introducing of the optical fiber 10 into the guiding channel 46 or 86 can be automatized by an additional extension 90, specifically formed as a groove or trough or sag, for example by a waveguide trough or by a fiber sag, said extension 90 being assignable to the optical subassembly 40 or 80, in particular to the guiding channel 46 or 86.

Though explicitly shown only for the seventh embodiment (cf. FIG. 11A to FIG. 11C), this extension 90 is respectively assigned also to the first embodiment (cf. FIG. 5A and FIG. 5B) up to the sixth embodiment (cf. FIG. 10), i.e. this extension 90 is arranged in front of the end of the guiding channel 46 or 86 in such way that a seamless and stepless transition into the guiding channel 46 or 86 is enabled, said end being averted from the converter 28 or 68.

In this context, the conformation and dimensioning (of the bottom) of the extension 90 is adapted to the conformation and dimensioning (of the corresponding circumferential line) of the guiding channel 46 or 86; for example, the bottom of the extension 90 may also have a circular form. Such a circular forming has the same diameter as the actual guiding channel 46 or 86.

By seamlessly and steplessly connecting the extension 90 to the guiding channel 46 or 86, it is enabled that an optical fiber 10 inserted into the expansion 90 precisely slides into the guiding channel 46 or 86 by simply moving forward.

The all around closed guiding channel 46 or 86 holds the end of the optical fiber 10 in a position exactly aligned with the converter 28 or 68 embedded in the optical subassembly 40 or 80, without any additional fixing measures, as for example glue, being necessary.

Figure 11A:
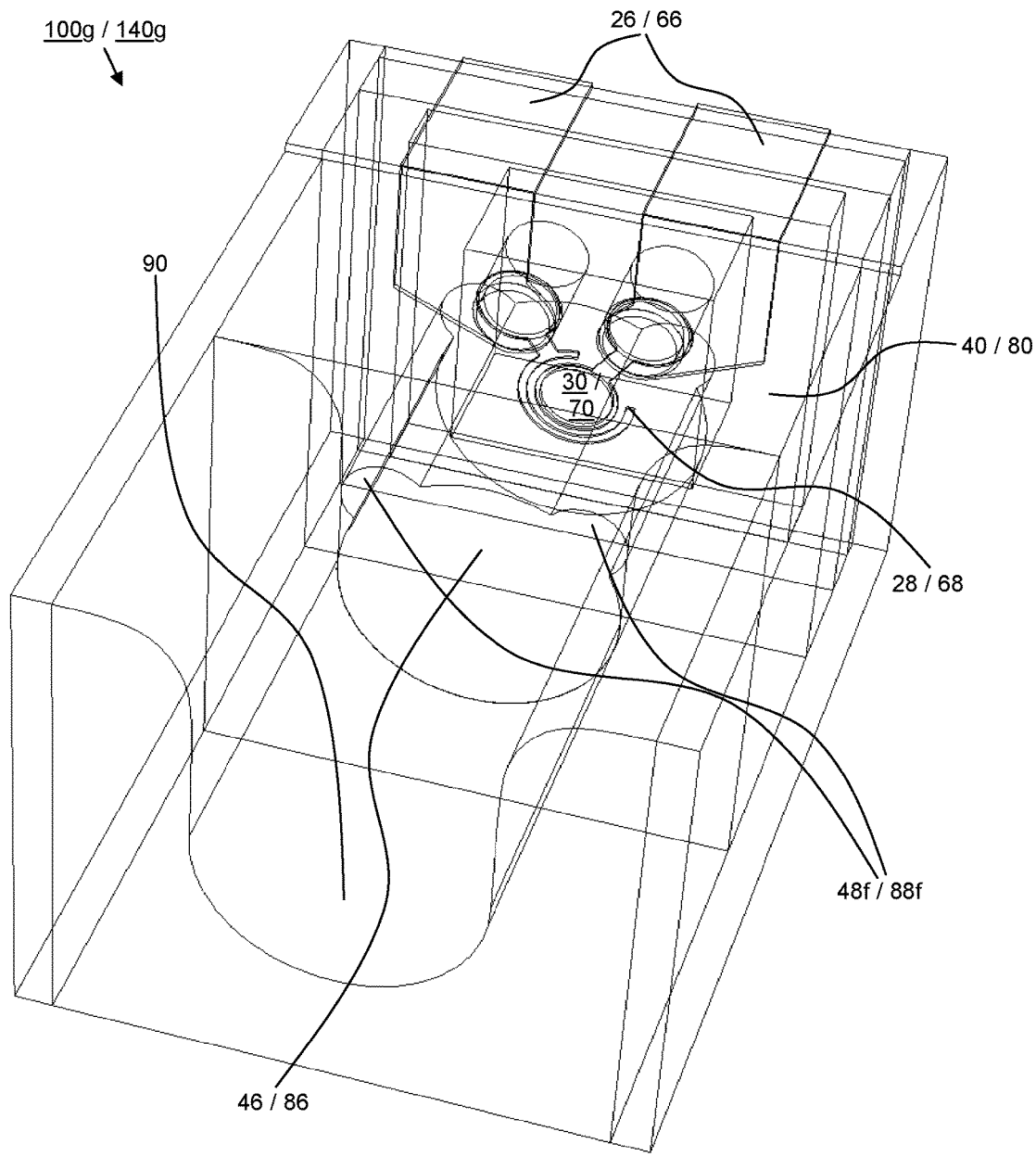
FIG. 11A a perspective view of a second detailed example for an optical subassembly (OSA) with embedded converter wherein the optical fiber or the waveguide is movable into the guiding channel of the OSA to the converter by means of an embodiment of the extension according to the present invention.
Figure 11B:
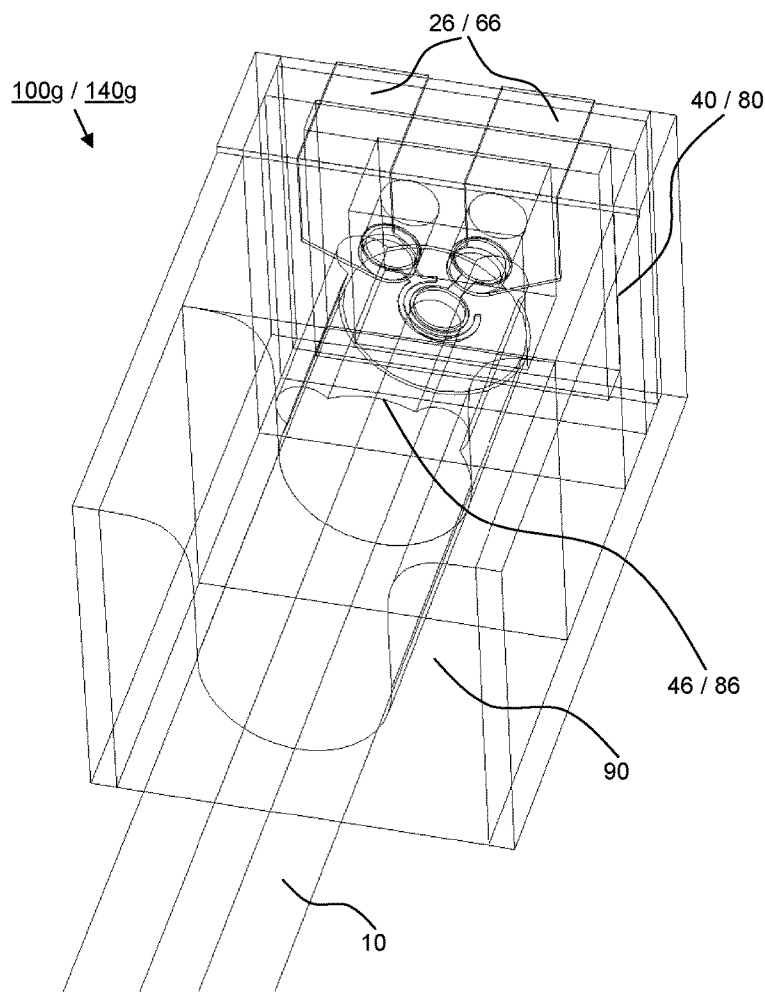
FIG. 11B a perspective view of the optical subassembly (OSA) of FIG. 11A with the optical fiber or waveguide inserted in the guiding channel by means of the extension.

With the extension 90 and the guiding channel 46 or 86 which is arranged in the optical subassembly 40 or 80, a novel fiber alignment element has been developed by means of which it is possible to automatically and inexpensively introduce the optical fiber 10 into the fiber guiding channel. In this context, FIG. 11B shows the fully introduced and aligned fiber 10 in the optical subassembly 40 or 80 with the fiber alignment element according to the present invention.

By this novel fiber alignment element, it is able to make the imprecisions of inexpensive placing robots or of inexpensive placing machines compatible with the demands on a precise alignment of the optical axis of the converter 28 or 68 with the optical axis of the optical fiber 10.

By the extension 90, a simple inserting of the optical fiber 10 is possible, said inserting allowing a certain tolerance. Once the optical fiber 10 lies on the bottom of the extension 90, moving forward of the fiber 10 into the guiding channel 46 or 86 suffices to accomplish the optical coupling between the converter 28 or 68 embedded in the OSA 40 or 80 and the optical fiber 10.

Figure 11C:
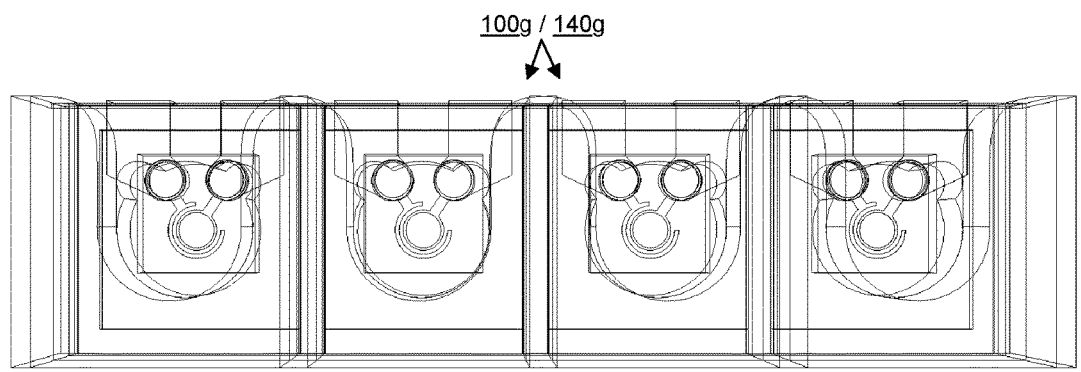
FIG. 11C a slightly perspective view of a multi-channel arrangement of the optical subassembly (OSA) of FIG. 11A and FIG. 11B with the optical fiber or waveguide insertable in the respective guiding channel by means of the respective extension.

As illustrated by FIG. 11C, the present invention may also be realized in the form of a multi-channel arrangement comprising several, by way of example four in FIG. 11C, guiding channels 46 or 86 being substantially parallel to each other, where a groove type or trough type or sag type extension 90, in particular a waveguide trough or a fiber sag, is arranged in front of each of these guiding channels 46 or 86, respectively.

Figure 2A:
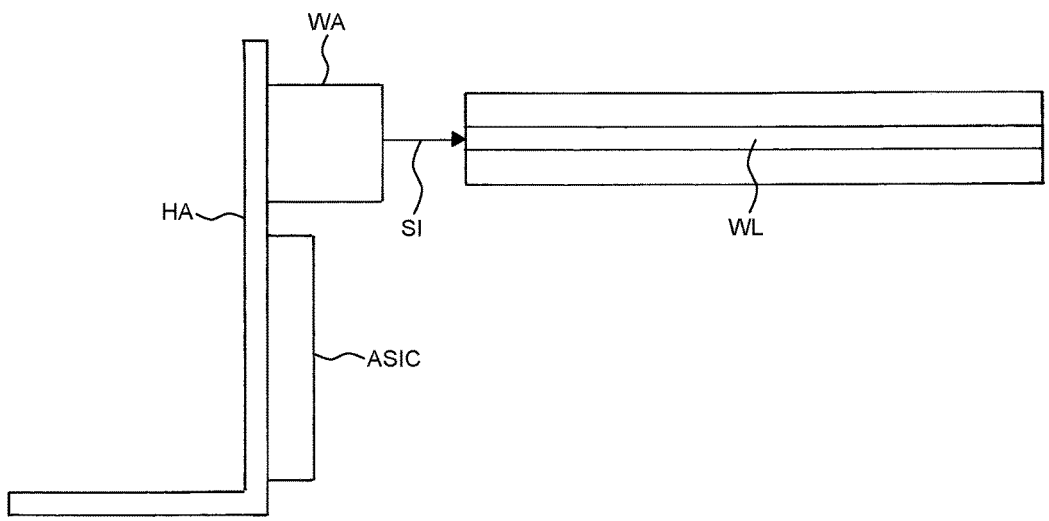
FIG. 2A a conceptual schematic view of a device according to the prior art, with which optical signals can be coupled in an axial direction to the waveguide by means of an L-bracket.
Figure 2B:
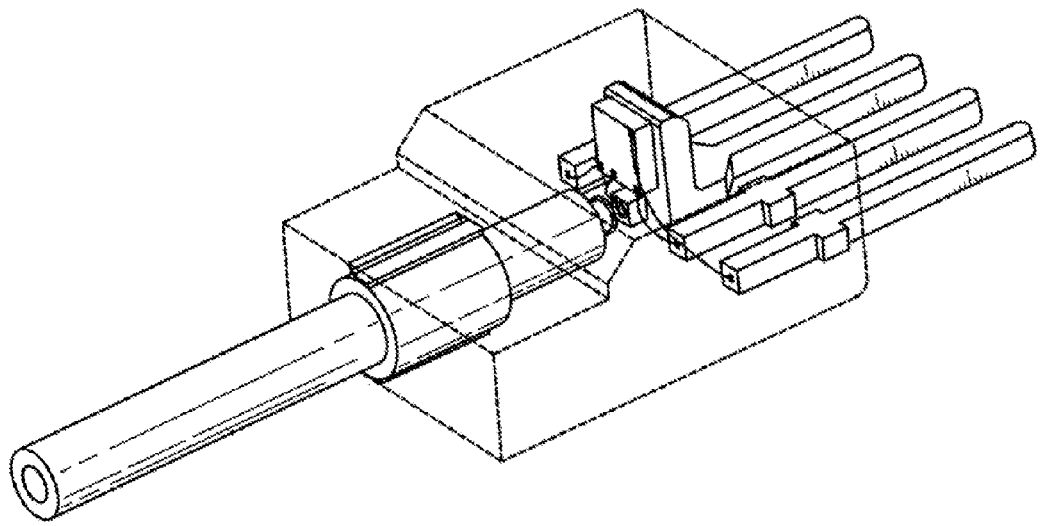
FIG. 2B a perspective view of an example for realizing a coupling or decoupling device according to the prior art, said device being provided for one waveguide.
Figure 3:
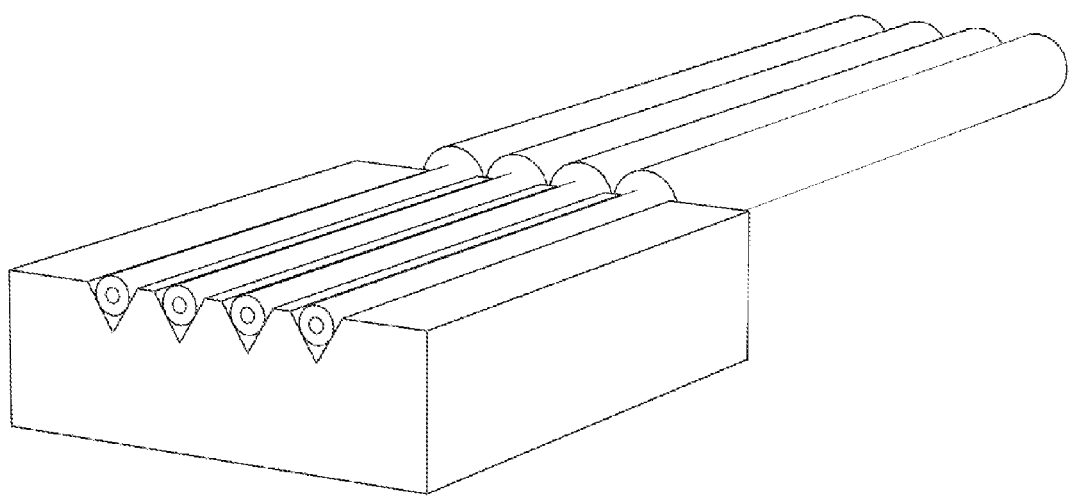
FIG. 3 a perspective view of an example for realizing a coupling or decoupling device according to the prior art, said device being provided for four waveguides.

LIST OF REFERENCE NUMERALS 10 waveguide, particularly optical fiber
12 axial direction of the waveguide 10, particularly optical fiber core
14 optical sheathing, of the waveguide 10
26 electrical contacting for electro-optical converter 28, in particular incident on a lateral surface of the send-site optical subassembly 40
28 electro-optical converter, in particular active optical transmission unit, for example laser, such as vertical cavity surface emitting laser (VCSEL)
30 output port or active surface of the electro-optical converter 28
32 distance between output port or active surface of the electro-optical converter 28 and core surface of the core of waveguide 10
40 send-site optical subassembly
46 send-site guiding channel
48d air outlet, particularly passthrough in the optical subassembly 40, for example a drillhole on the end of guiding channel 46 closest to the converter 28 extending transversely, or substantially perpendicularly to the direction or axis of the core 12 of waveguide 10 (=fourth exemplary embodiment; cf. FIG. 8)
48e air outlet, particularly air outlet groove or groove-like air outlet (=fifth exemplary embodiment; cf. FIG. 9)
48f air outlet, particularly air outlet channel or channel-like air outlet (=sixth or seventh exemplary embodiment; cf. FIG. 10 or FIG. 11A to FIG. 11C)
66 electrical contacting for opto-electrical converter 68, in particular incident on a lateral surface of the receive-site optical subassembly 80
68 opto-electrical converter, in particular active optical reception unit, for example diode, such as a photodiode (PD)
70 input port or active surface of the opto-electrical converter 68
72 distance between core 12 of waveguide 10 and input port or active surface 70 of the opto-electrical converter 68
80 receive-site optical subassembly
86 receive-site guiding channel
88d air outlet, particularly passthrough in the optical subassembly 80, for example a drillhole on the end of guiding channel 86 closest to the converter 68 extending transversely, or substantially perpendicularly to the direction or axis of the core 12 of waveguide 10 (=fourth exemplary embodiment; cf. FIG. 8)
88e air outlet, particularly air outlet groove or groove-like air outlet (=fifth exemplary embodiment; cf. FIG. 9)
88f air outlet, particularly air outlet channel or channel-like air outlet (=sixth or seventh exemplary embodiment; cf. FIG. 10 or FIG. 11A to FIG. 11C)
90 extension, in particular having the form of a groove or trough or sag, for example waveguide trough or fiber sag
100a send-site device (=first exemplary embodiment; cf. FIG. 5A and FIG. 5B)
100b send-site device (=second exemplary embodiment; cf. FIG. 6)
100c send-site device (=third exemplary embodiment; cf. FIG. 7)
100d send-site device (=fourth exemplary embodiment; cf. FIG. 8)
100e send-site device (=fifth exemplary embodiment; cf. FIG. 9)
100f send-site device (=sixth exemplary embodiment; cf. FIG. 10)
100g send-site device (=seventh exemplary embodiment; cf. FIG. 11A to FIG. 11C)
140a receive-site device (=first exemplary embodiment; cf. FIG. 5A and FIG. 5B)
140b receive-site device (=second exemplary embodiment; cf. FIG. 6)
140c receive-site device (=third exemplary embodiment; cf. FIG. 7)
140d receive-site device (=fourth exemplary embodiment; cf. FIG. 8)
140e receive-site device (=fifth exemplary embodiment; cf. FIG. 9)
140f receive-site device (=sixth exemplary embodiment; cf. FIG. 10)
140g receive-site device (=seventh exemplary embodiment; cf. FIG. 11A to FIG. 11C)
ASIC circuit, in particular application-specific integrated circuit (ASIC), for example custom chip (=prior art; cf. FIG. 1 and FIG. 2A)
HA bracket (=prior art; cf. FIG. 2A)
SI optical signal (=prior art; cf. FIG. 1 and FIG. 2A)
US deflection mirror (=prior art; cf. FIG. 1)
WA optical converter (=prior art; cf. FIG. 1 and FIG. 2A)
WL optical waveguide (=prior art; cf. FIG. 1 and FIG. 2A)

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention.

What is claimed is:

1. A device for coupling optical signals into at least one waveguide, wherein the device comprises at least one electro-optical converter which sends out the optical signals in the direction of an axis or a core of the waveguide,
wherein the electro-optical converter is incorporated in at least one send-site optical subassembly, wherein the send-site optical subassembly comprises at least one guiding channel for aligning the waveguide with respect to the electro-optical converter, wherein at least one extension has the same diameter as the guiding channel and is assigned to the send-site optical subassembly, said extension being provided for aligning the waveguide with respect to the guiding channel, wherein the extension is arranged in front of the end of the guiding channel in such way that a stepless transition into the guiding channel is defined, said end being averted from the converter, wherein at least one air outlet is provided along an entire length of the guiding channel, wherein trapped or compressed air can be vented via said air outlet when the waveguide is inserted in the guiding channel, and wherein the air outlet is provided only in the area of the guiding channel which does not encounter the extension.

2. The device according to claim 1, wherein the extension has the form of a groove or trough or sag.

3. The device according to claim 1, wherein the form or the dimensioning of the extension
is adapted to the form or to the dimensioning of the guiding channel, or
is substantially equal to the form or to the dimensioning of the guiding channel.

4. The device according to claim 1, wherein the extension is produced from at least one optically transparent or optically semi-transparent medium.

5. The device according to claim 1, wherein the air outlet has the form of a groove or channel.

6. The device according to claim 1, wherein at least two substantially parallel guiding channels are provided, with a respective extension being arranged before each guiding channel.

7. A device for decoupling optical signals from at least one waveguide, wherein the device comprises at least one opto-electrical converter which receives the optical signals from the direction of an axis or a core of the waveguide, wherein the opto-electrical converter is incorporated in at least one receive-site optical subassembly, wherein the receive-site optical subassembly comprises at least one guiding channel for aligning the waveguide with respect to the opto-electrical converter, wherein at least one extension has the same diameter as the guiding channel and is assigned to the receive-site optical subassembly, said extension being provided for aligning the waveguide with respect to the guiding channel, wherein the extension is arranged in front of the end of the guiding channel in such way that a stepless transition into the guiding channel is defined, said end being averted from the converter, wherein at least one air outlet is provided along an entire length of the guiding channel, wherein trapped or compressed air can be vented via said air outlet when the waveguide is inserted in the guiding channel, and wherein the air outlet is provided only in the area of the guiding channel which does not encounter the extension.

8. The device according to claim 7, wherein the extension has the form of a groove or trough or sag.

9. The device according to claim 7, wherein the form or the dimensioning of the extension
is adapted to the form or to the dimensioning of the guiding channel, or
is substantially equal to the form or to the dimensioning of the guiding channel.

10. The device according to claim 7, wherein the extension is produced from at least one optically transparent or optically semi-transparent medium.

11. The device according to claim 7, wherein the air outlet has the form of a groove or channel.

12. The device according to claim 7, wherein at least two substantially parallel guiding channels are provided, with a respective extension being arranged before each guiding channel.

* * * * *